Jan. 13, 1925.    1,522,536
J. F. O'CONNOR
FRICTION SHOCK ABSORBING MECHANISM
Original Filed Dec. 10, 1921    4 Sheets-Sheet 1
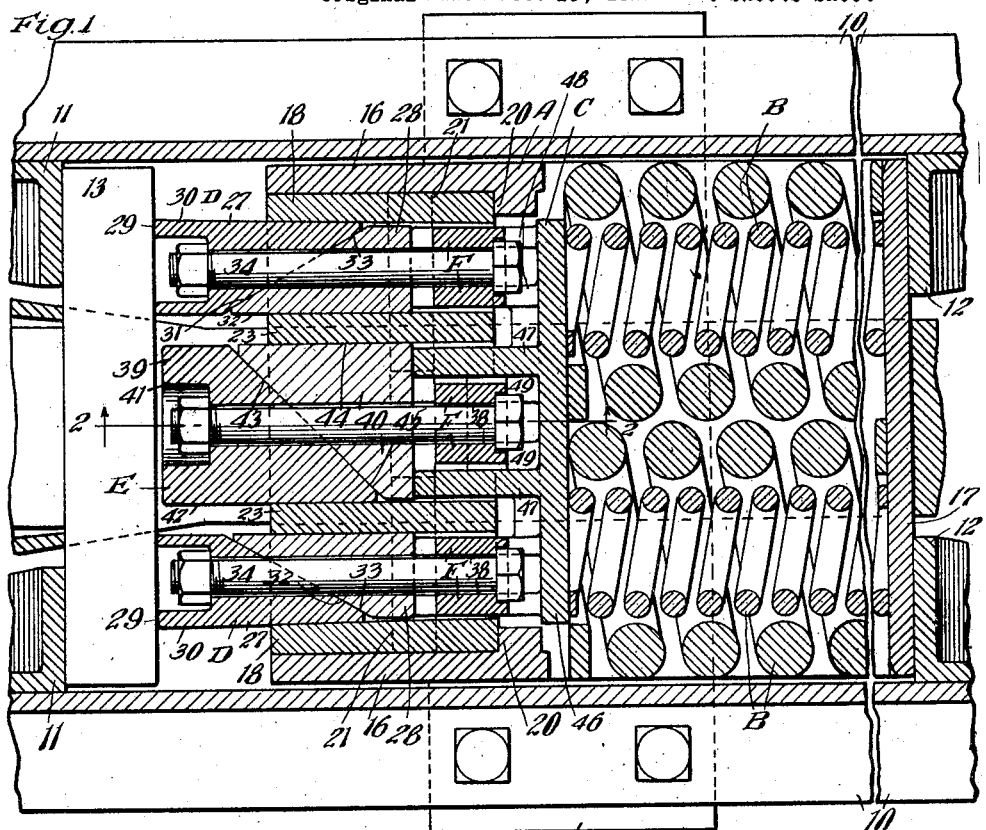
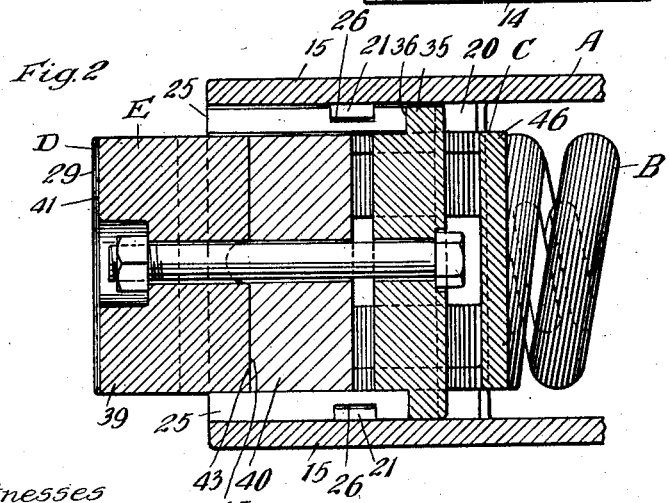
Witnesses
Wm. Geiger
Inventor
John F. O'Connor
By Geo. I. Haight
His Atty.

Jan. 13, 1925.
J. F. O'CONNOR
1,522,536
FRICTION SHOCK ABSORBING MECHANISM
Original Filed Dec. 10, 1921   4 Sheets-Sheet 2
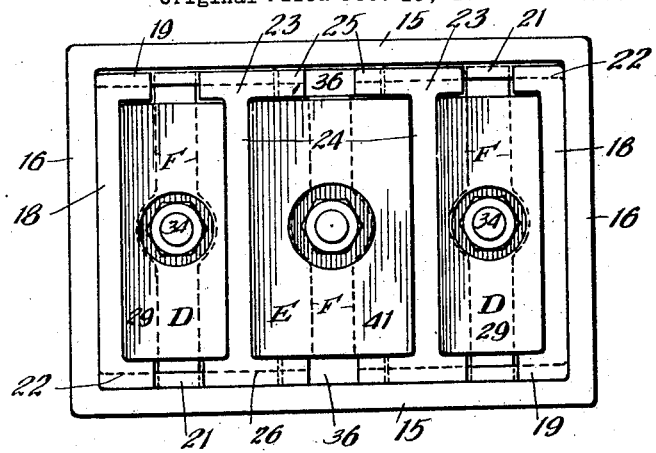
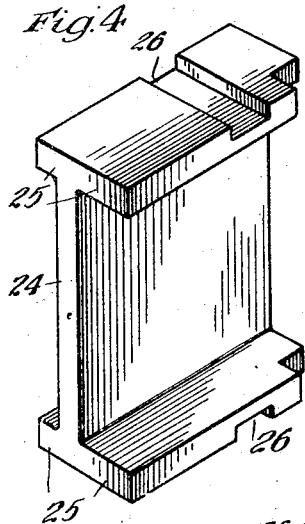
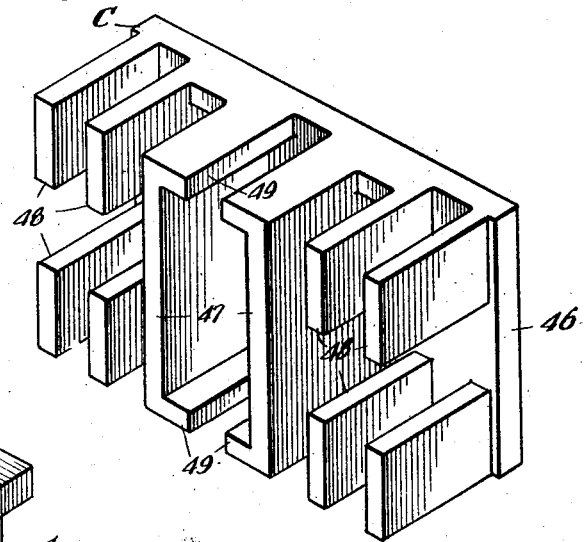
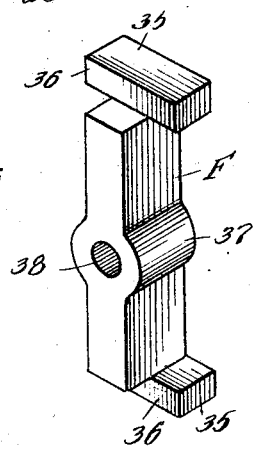
Witnesses
Wm. Geiger
Inventor
John F. O'Connor
By Geo. I. Haight
His Atty.

Jan. 13, 1925.  1,522,536
J. F. O'CONNOR
FRICTION SHOCK ABSORBING MECHANISM
Original Filed Dec. 10, 1921   4 Sheets-Sheet 3
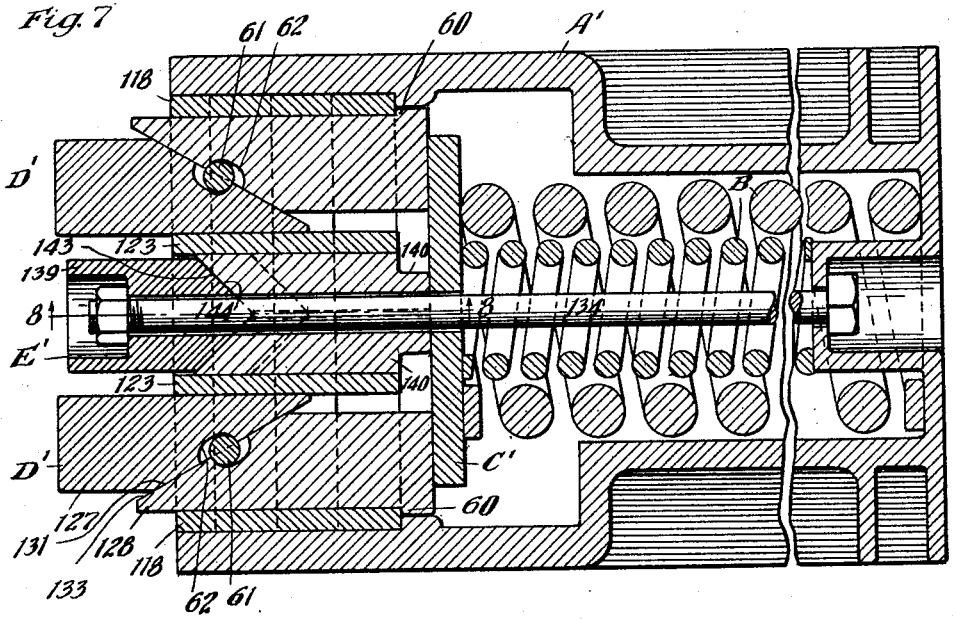
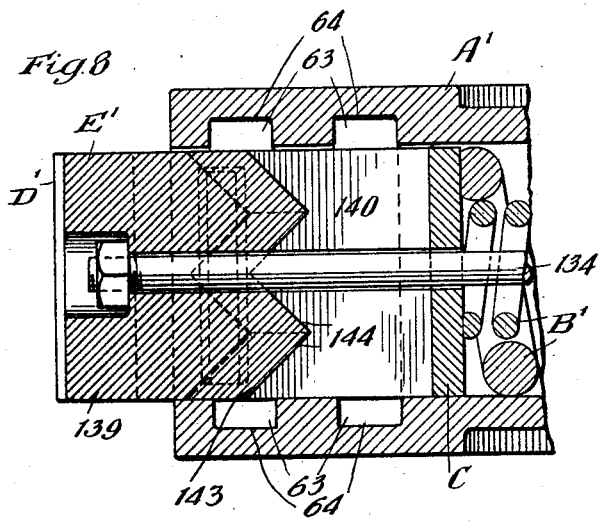
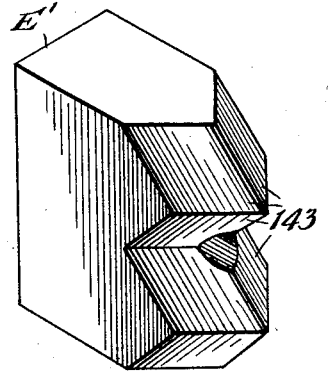
Witnesses
Wm. Geiger
Inventor
John F. O'Connor
By Geo. I. Haight
His Atty.

Jan. 13, 1925. 1,522,536
J. F. O'CONNOR
FRICTION SHOCK ABSORBING MECHANISM
Original Filed Dec. 10, 1921 4 Sheets-Sheet 4
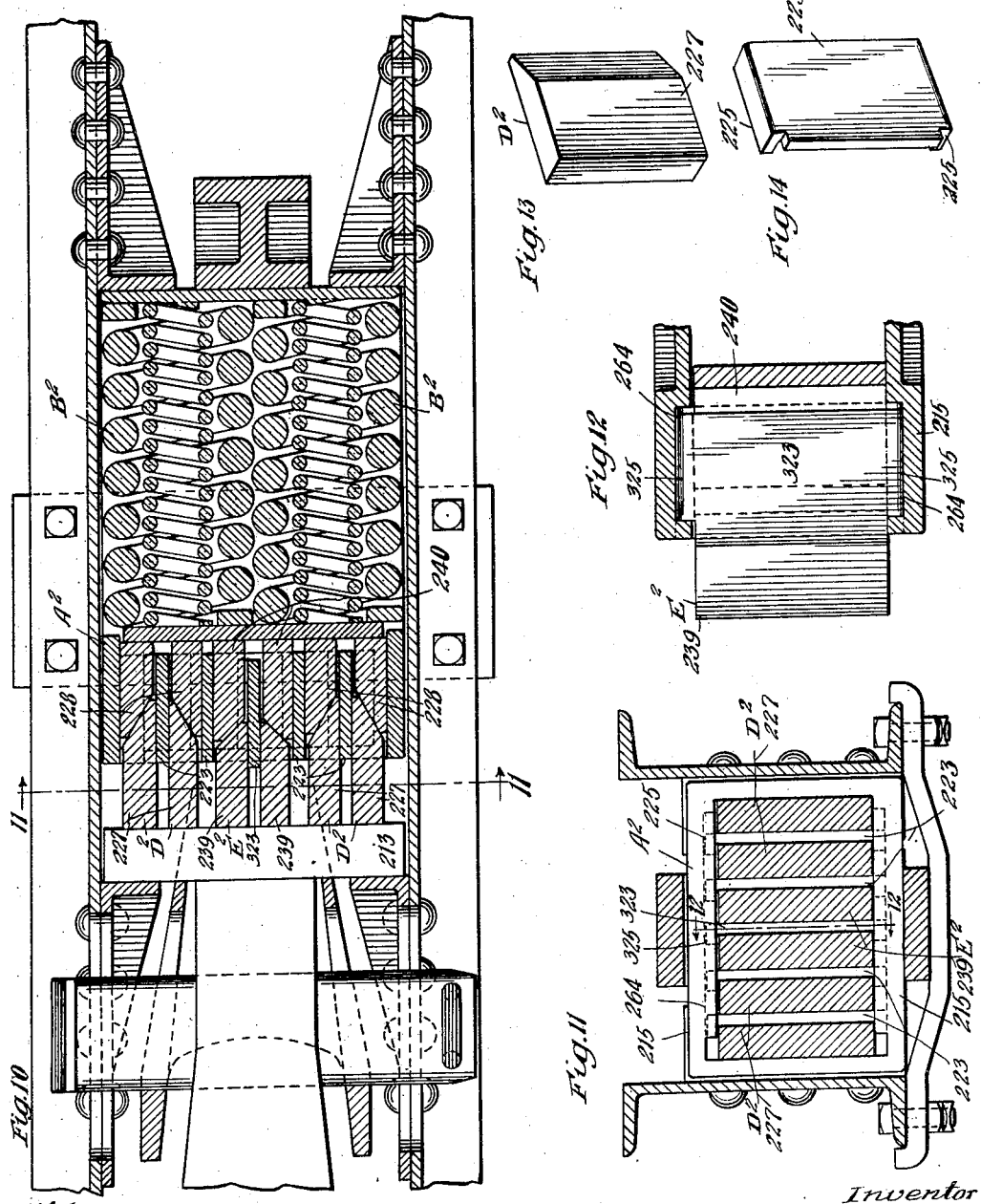
Witnesses
Wm. Geiger
Inventor
John F. O'Connor
By Geo. J. Haight
His Atty.

Patented Jan. 13, 1925.

1,522,536

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 10, 1921, Serial No. 521,201. Renewed June 7, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism, especially adapted for railway draft riggings, and wherein are obtained large frictional wearing areas and the friction generating means so arranged as to provide relatively keen and relatively blunt angle wedging effects.

Another object of the invention is to provide a mechanism of the character indicated wherein are employed a plurality of sets of friction devices operating in twin formation, certain of the sets of friction devices employing relatively keen angle wedges to thereby obtain high frictional capacity and others blunt angle wedges to insure release.

The invention furthermore consists in the improvements in the parts and devices and in the novel combinations of the parts and devices herein shown, described and made the subject matter of claim.

In the drawings forming a part of this specification, Figure 1 is a horizontal, longitudinal, sectional view, parts broken away, of a railway draft rigging showing my improvements in connection therewith. Figure 2 is a vertical, longitudinal, sectional view corresponding substantially to the line 2—2 of Figure 1, certain of the parts being omitted in Figure 2. Figure 3 is an end elevational view of the shock absorbing mechanism proper shown in Figure 1. Figures 4, 5 and 6 are detail perspectives of one of the stationary partitions or friction plates, the spring follower, and one of the bolt-anchoring bars, respectively. Figure 7 is a view similar to Figure 1 illustrating another embodiment of my invention, Figure 7 showing the shock absorbing mechanism proper only, without the underframe parts. Figure 8 is a vertical, sectional view corresponding substantially to the line 8—8 of Figure 7. Figure 9 is a detail perspective of one of the pressure-transmitting wedges employed in the construction shown in Figures 7 and 8. Figure 10 is a view similar to Figure 1, upon a somewhat smaller scale, illustrating a still further embodiment of my invention. Figure 11 is a vertical, transverse, sectional view corresponding substantially to the line 11—11 of Figure 10. Figure 12 is a longitudinal, vertical, sectional view of the shock absorbing mechanism proper corresponding to the line 12—12 of Figure 11, Figure 12 being upon a somewhat larger scale than Figure 11. And Figures 13 and 14 are detail perspectives of one of the wedge-friction-shoes and one of the relatively stationary friction walls or partitions employed in the construction shown in Figure 10, respectively.

Referring first to the construction illustrated in Figures 1 and 2, 10—10 denote channel draft sills of a car underframe, the same having front and rear stop lugs 11 and 12 secured to the inner faces thereof in the usual manner. The improved shock absorbing mechanism is interposed between the stop lugs and cooperable therewith is a front main follower 13. As will be understood by those skilled in the art, the mechanism is adapted to be actuated by a drawbar and yoke of suitable construction, and the parts supported in operative position by a detachable saddle plate 14. The improved shock absorbing mechanism, proper, as shown, comprises, broadly, a combined friction shell and spring cage or column-load-sustaining member, or follower-acting member A; twin arranged main springs B—B; a spring follower C; two outer like sets of friction devices each designated generally by the reference D; and a central set of friction devices designated generally by the reference E.

The casing A is provided with a shell proper preferably at the front or outer end thereof, the same being of rectangular outline defined by upper and lower horizontal walls 15—15 and side walls 16—16. The upper and lower walls 15 are extended to the rear of the casting and integrally united by a rear wall 17 which acts as a rear follower in conjunction with the rear stop lugs 12. The side walls 16 of the casting A are relatively short so as to leave the major portion of the sides of the casting open to permit of the insertion and removal of certain of the parts.

The rectangular friction shell, above mentioned, is provided with a pair of side liners 18—18 suitably recessed into the side walls 16, said liners 18 having top and bottom inwardly extended flanges 19—19 as indicated in Figure 3. The liners 18 are prevented against inward movement with respect to the casting A by a suitably inturned shoulder 20 on the casting as shown in Figure 1. Said liners 18 are additionally prevented from such inward movement and also against outward movement with respect to the casting A by means of transversely extending ribs 21—21 on the inner faces of the upper and lower walls 15 which ribs 21 extend within corresponding grooves 22—22 in said flanges 19—19.

Intermediate the sides of the friction shell, the latter has anchored thereto preferably a pair of intermediate partitions or walls or relatively stationary friction plates 23—23. One of said friction plates 23 is illustrated separately in Figure 4. Each of said plates or partitions 23 preferably consists of a vertically extending main web 24 and top and bottom flanges 25—25 extended to both sides of the web 24. Each of the flanges 25 is formed with a transversely extending groove 26 adapted to cooperate with said ribs 21 in anchoring the plates or partitions 23 against longitudinal movement with respect to the casting A.

From the preceding description, it will be seen that the two side walls of the shell (of which the liners 18 may be considered a part) and the two intermediate walls or partitions 23 divide the friction shell proper into three chambers arranged side by side and extending lengthwise of the casting, that is, parallel to the center line of the mechanism. Obviously the opposed faces of the liners 18 and intermediate partitions 23 provide longitudinally extending friction surfaces with which are adapted to cooperate other friction elements, as hereinafter described. It will be noted also that the intermediate partitions 23, although anchored against longitudinal movement with respect to the casting, are nevertheless freely responsive to laterally applied pressure and may therefore readily adjust themselves to variations in pressures applied to the sides thereof.

The sets of friction devices D, which are in the two outer friction chambers above referred to, are of like construction. Each set comprises an outer load or pressure-transmitting combined wedge and friction shoe 27 and an inner combined wedge and friction shoe 28. As shown, the member 27 has an outer flat face 29 engaged by the follower 13, an outer longitudinally extending friction surface 30 cooperable with the friction surface provided by the adjacent liner 18, and a wedge face 31. The inner member 28 has a longitudinally extending friction surface 32 cooperable with the adjacent intermediate wall or partition 23, and a wedge face 33 cooperable with the wedge face 31. The maximum thickness of each of the elements 27 and 28, considered horizontally, is made slightly less than the normal horizontal width of the friction chamber. The two members 27 and 28 of each set of friction devices D are held in proper position with respect to each other and with respect to the casting A by means of a suitable retainer bolt 34 which extends through openings in the members 27 and 28 and is anchored at its rear end to a cross bar or anchor bar F, shown in perspective in Figure 6.

Each anchor bar F extends vertically within the casing A. The middle bar F, at the top and bottom thereof, is provided with transversely extending flanges 35—35 presenting forwardly facing shoulders 36—36 which coperate with the flanges 25 of the partitions 23 to limit the forward or outward movement of the bars F. The outer bars F are shouldered to engage the ribs 21 for the same purpose. Each bar F is centrally enlarged as indicated at 37 and perforated as indicated at 38 to accommodate the shanks of the bolts, as will be understood.

The set of friction devices E is disposed within the central chamber of the friction shell, said set comprising an outer load or pressure-transmitting wedge-friction-shoe 39 and an inner wedge-friction-shoe 40. The former has an outer flat face 41 adapted to be engaged by the follower 13, a longitudinally extending friction surface 42 cooperable with one of the intermediate partitions 23, and a wedge face 43. The wedge-friction-shoe 40 has a longitudinally extending friction surface 44 cooperable with the other of the intermediate partitions, and a wedge face 45 cooperable with the wedge face 43. The members of this set of friction devices are held in assembled relation by means similar to those previously described in connection with the outer sets of friction devices. In the case of the central set of friction devices E, the pressure-transmitting wedge 39 is normally separated a limited distance, approximately $\frac{1}{16}''$ in actual service, from the front follower, as shown.

The spring follower C, shown best in Figures 1 and 5, is of special form and comprises a main plate section 46 engaged on its rear face by the springs B; a pair of laterally spaced centrally disposed flanges 47—47 and other forwardly extended sets of flanges 48—48 arranged in pairs vertically and horizontally on opposite sides of the central set of flanges 47. The central flanges 47 are preferably strengthened by top and bottom inturned flanges 49—49. All of the flanges 47 and 48 are laterally separated so as to straddle the bolt-anchoring bars F and the intermediate partitions 23—23. The forward ends of all of said flanges terminate preferably in the same plane and engage the inner elements of the three sets of friction devices D and E, as best indicated in Figure 1, so that all of the sets of friction devices are yieldingly resisted by the springs B—B.

Referring to Figure 1, it will be noted that the cooperating sets of wedge faces 31 and 33 of the two outer sets of friction devices extend at a relatively keen or acute angle with respect to the axis of the mechanism and forces applied parallel thereto whereas the cooperating wedge faces 43 and 45 of the central set of friction devices E, extend at a relatively blunt angle with respect to said center line and similarly applied forces. By means of this arrangement, I am enabled to obtain very high frictional capacity induced especially by the two outer sets of friction devices D since the angle of the faces 31 and 32 may be made very acute without danger of the mechanism "sticking" since, in release, the blunt angle wedge faces 43 and 45 permit of collapse, laterally, of the central set of devices E, thus allowing the intermediate partitions 23—23 to move inwardly toward each other under the stresses set up in the friction shell, this action in turn thereby reducing the pressure on the outer keen wedge angle sets of friction devices D—D. During compression, it will be evident that the central set of friction devices E generates a considerable portion of the entire friction and will prevent the intermediate partitions 23—23 from approaching each other laterally so that the desired high frictional capacity may be generated by the two outer sets of friction devices D which are arranged on opposite sides of the central set.

As hereinbefore described, the outer end of the wedge member 39 is slightly spaced from the follower 13, the purpose of this being to insure the setting up of the main wedge action on the two outer sets of friction devices D—D before any of the compression force or load is applied directly to the central set of devices E.

During the compression stroke under blows applied parallel to the center line of the mechanism, there are obviously certain stresses set up in the friction shell causing the latter to distend or expand slightly, these forces reacting upon removal of the compression load in a direction transverse or substantially perpendicular to the center line of the mechanism. While such inwardly directed transverse forces would not of themselves insure collapse of the two outer sets of friction devices D on account of the keen angle wedge faces thereof, nevertheless such forces will insure collapse of the central set of friction devices E on account of the blunt angle wedge faces 43 and 45. The collapse of the two members 39 and 40 allows the two partitions 23 to approach each other, thus relieving the two outer sets of friction devices E.

Referring next to the construction illustrated in Figures 7, 8 and 9, a combined friction shell and spring cage casting A′ is employed modified however to accommodate only one spring B′. As in the case of the construction first described, the casting A′ is provided with suitable liners 118—118 and intermediate partitions or stationary friction plates 123—123 anchored to the casting A′ against longitudinal movement with respect thereto.

In the arrangement of Figures 7, 8 and 9, two outer sets of friction-creating devices D′—D′ are employed and a central set of friction devices E′.

Each of the outer sets of friction devices D′ comprises an outer load or pressure-transmitting wedge-friction-shoe 127 and an inner wedge-friction-shoe 128, said members having cooperating wedge faces 131 and 133, respectively, the same being arranged at a relatively acute or keen angle with respect to the center line of the mechanism. In this arrangement, to hold the parts in assembled relation, the wedge-friction-shoes 128 are preferably provided with laterally extended flanges 60 at their inner ends which engage behind the liners 118, thus limiting the outward movement of the members 128. The other members 127 are limited in their outward movement with respect to the wedge shoes 128 by rollers 61 loosely seated in suitable recesses 62—62 provided in the wedge faces 131 and 133.

The central set of friction gripping devices E′, in the construction illustrated in Figures 7, 8 and 9, consists of an outer pressure-transmitting wedge 139 and a pair of laterally opposed wedge-friction-shoes 140—140. The members 139 and 140 have cooperating wedge faces 143 and 144 which converge inwardly of the shell and are arranged at a relatively blunt and, preferably non-wedging angle with respect to the center line of the mechanism and forces applied substantially parallel thereto. The central set of friction devices E′ is held in assembled relation with the shell by a retainer bolt 134 which is anchored to the member 139 and to a suitable hollow boss at the rear end of the casting A′.

The plate follower C′ is interposed between the spring B′ and the inner elements of each of the three sets of friction devices D′ and E′.

In the construction of Figures 7, 8 and 9, the intermediate partitions 123 and the liners 118 are preferably anchored to the casting A' by pairs of upwardly and downwardly extended lugs 63—63 extending into corresponding channels or grooves 64—64 on the inner sides of the top and bottom walls of the casting A'. The operation of the construction just described is similar to that of the first described construction and need not be detailed.

Referring next to the construction illustrated in Figures 10 to 14, inclusive. In this arrangement, a combined friction shell and spring cage casting $A^2$ is provided similar in all substantial respects with the casting A and adapted to house two springs $B^2$—$B^2$. The casting $A^2$ has the friction shell proper thereof divided into six friction chambers arranged side by side, by means of four intermediate partitions or walls or stationary friction plates 223—223 and a wall or plate 323, the latter being located centrally. The partitions or plates 223 are anchored to the casting $A^2$ against longitudinal movement with respect thereto by means of top and bottom horizontally extended flanges 225—255 seated within transversely extending recesses 264 on the inner sides of the top and bottom walls 215 of the casting $A^2$. The central partition 323 is similar to the other partitions 223 except that the top and bottom flanges 325—325 thereof are made shorter lengthwise of the mechanism to thereby allow said partition 323 a limited amount of longitudinal movement with respect to the casting $A^2$, for the purpose hereinafter described.

In the arrangement of Figures 10 to 14 inclusive, six sets of friction devices are employed, four of them, two on each outer side as indicated at $D^2$—$D^2$, being of like arrangement and the two central ones, $E^2$—$E^2$, being also of like construction.

Each of the sets of friction devices $D^2$ comprises an outer load or pressure-transmitting wedge-friction-shoe 227 and an inner wedge-friction-shoe 228, the same co-operating with opposed friction surfaces provided on the interior of the shell by either the side walls or partitions 223 thereof. The wedge faces employed between the members 227 and 228 are extended at a relatively acute angle with respect to the center line of the mechanism and forces applied parallel thereto so as to insure the creation of the desired friction capacity.

Each of the central sets of friction devices $E^2$ comprises an outer load or pressure-transmitting wedge-friction-shoe 239 and an inner wedge-friction-shoe 240. The cooperating wedge faces of the member 239 and 240 are extended at a relatively blunt angle with respect to the center line of the mechanism and forces applied parallel thereto.

In the arrangement of Figure 10, it will be noted that all of the outer members of the six sets of friction devices $D^2$ and $E^2$ are normally in engagement with the front follower 213 and hence a certain percentage of the load will be applied to the wedge members 239. On account of the fact that the central partition 323 is movable for a limited distance lengthwise of the casting $A^2$, the two wedge members 239 with the interposed partition 323 will act substantially as a solid unit during the limited travel of the partition 323, thereby inducing less frictional capacity than obtains after the partition 323 is held against movement. This allows of the same effect being obtained as in the other constructions previously described, since the wedging action produced by the four outer sets of friction devices $D^2$ will be greatly in excess of that produced initially by the two central sets of devices $E^2$. After the central partition 323 reaches its innermost position and the two sets of friction devices $E^2$ then begin to act independently, the action is the same as in the other constructions previously described after the central devices thereof have been picked up by the actuating follower.

In the construction shown in Figure 10, release is facilitated by reason of the central portion 323 which is adapted to move outwardly a limited distance with the two wedge members 239 acting therewith substantially as a solid unit. This release action is supplemental to that induced by the inwardly directed transverse or lateral forces caused by the contraction of the shell after the removal of the actuating force.

I have herein shown and described several methods of carrying out my invention, but the same are by way of illustration only and not intended as limitations, inasmuch as I am aware that many changes and modifications may be made to various details of construction and arrangement of parts within the scope of my invention and all such changes and modifications are contemplated as come within the scope of the claims appended hereto.

I claim:

1. In a friction shock absorbing mechanism, the combination with a friction shell having a plurality of friction chambers arranged side by side; of a spring resistance; and a set of friction devices, each including a friction shoe and wedge means, in each friction chamber, certain of said sets having cooperable relatively keen angle wedge faces and the remainder cooperable relatively blunt angle wedge faces.

2. In a friction shock absorbing mechanism, the combination with a friction shell having a plurality of friction chambers arranged side by side and formed by opposed walls of the shell proper and intermediate partitions, the latter being responsive to pressure applied transversely thereto; of a spring resistance; and a set of friction devices in each of said chambers, each set including a friction shoe and wedge means, certain of said sets having cooperable keen angle wedge means and the remainder cooperable relatively blunt wedge means.

3. In a friction shock absorbing mechanism, the combination with a friction shell having a plurality of friction chambers arranged side by side; of a spring resistance; a set of friction devices, each including a friction shoe and wedge means, in each friction chamber, certain of said sets having cooperable relatively keen angle wedge faces and the remainder cooperable relatively blunt angle wedge faces; and a follower interposed between the inner ends of said sets of devices and the spring.

4. In a friction shock absorbing mechanism, the combination with a friction shell having a plurality of friction chambers arranged side by side and formed by opposed walls of the shell proper and intermediate partitions, the latter being responsive to pressure applied transversely thereto; of a spring resistance; a set of friction devices in each of said chambers, each set including a friction shoe and wedge means, certain of said sets having cooperable keen angle wedge means and the remainder cooperable relatively blunt wedge means; and a follower interposed between the inner ends of said sets of devices and the spring.

5. In a friction shock absorbing mechanism, the combination with a column-load-sustaining member, said member having a plurality of spaced walls extending lengthwise thereof and together providing a plurality of longitudinally arranged friction chambers, one of said walls being laterally movable and responsive to laterally applied pressure thereon; of a plurality of sets of friction devices, corresponding in number to said friction chambers, one set in each chamber, each set including friction shoe and wedge means, the effective wedge angle of one set of friction devices being relatively blunt and that of others, relatively keen; and spring means to yieldingly resist relative longitudinal movement between said sets of friction devices and said member.

6. In a friction shock absorbing mechanism, the combination with a column-load-sustaining member, said member having a plurality of walls extending lengthwise thereof and together providing a plurality of longitudinally arranged friction chambers, one of said walls being laterally movable and responsive to laterally applied pressure thereon; of a plurality of sets of friction devices, corresponding in number to said friction chambers, one set in each chamber, each set including friction shoe and wedge means, the effective wedge angle of one set of friction devices being relatively blunt, said set being cooperable with the laterally movable wall, and the effective wedge angle of others of the sets being relatively keen; and spring means yieldingly resisting relative longitudinal movement between said sets of friction devices and said member.

7. In a friction shock absorbing mechanism, the combination with a column-load-sustaining member, said member having a plurality of spaced walls extending lengthwise thereof and together providing a plurality of longitudinally arranged friction chambers, one of said walls being laterally movable and responsive to laterally applied pressure thereon; of a plurality of sets of friction devices, corresponding in number to said friction chambers, one set in each chamber, each set including friction shoe and wedge means, the effective wedge angle of one set of friction devices being relatively blunt and that of others, relatively keen; spring means to yieldingly resist relative longitudinal movement between said sets of friction devices and said member; and a follower interposed between said spring means and the inner ends of all of said sets of friction devices.

8. In a friction shock absorbing mechanism, the combination with a column-load-sustaining member, said member having a plurality of spaced walls extending lengthwise thereof and together providing a plurality of longitudinally arranged friction chambers, one of said walls being laterally movable and responsive to laterally applied pressure thereon; of a plurality of sets of friction devices corresponding in number to said friction chambers, one set in each chamber, each set including a wedge-friction-shoe and an outer load-transmitting wedge, the effective wedge angle of one set of devices being relatively blunt and the effective wedging angle of other of the sets of devices being relatively keen; and spring means yieldingly resisting relative longitudinal movement between said sets of friction devices and said member.

9. In a friction shock absorbing mechanism, the combination with a friction shell having a plurality of friction chambers arranged side by side; of a spring resistance; and a set of friction devices in each friction chamber, certain of said sets of devices having relatively blunt wedge-acting faces, and disposed centrally of the shell, the remaining sets of devices having relatively keen angle wedge-acting faces and disposed on opposite sides of said blunt angle wedge set of devices.

10. In a friction shock absorbing mechanism, the combination with a combined friction shell and spring cage, said shell having a plurality of partitions on the interior thereof restricted against longitudinal movement with respect to the shell and dividing the latter into a plurality of friction chambers, said partitions being responsive to laterally applied pressure thereon; of a spring resistance within the spring cage; and a plurality of sets of friction devices, one set in each friction chamber, some of said sets comprising elements having cooperable keen angle wedge faces and the remainder of the sets comprising elements having cooperable relatively blunt angle wedge faces, the sets of devices having the keen angle wedge faces being arranged to receive the actuating force prior to the other sets.

11. In a friction shock absorbing mechanism, the combination with a combined friction shell and spring cage, the shell having a pair of intermediate partitions therein dividing the shell into three friction chambers; of a set of friction devices in the central friction chamber, said set comprising elements having cooperable relatively blunt angle wedge faces; a set of friction devices in each of the outer friction chambers, each set comprising elements having cooperable relatively keen angle wedge faces; a spring resistance within the cage; and a follower interposed between said spring and the inner ends of all three sets of friction devices.

12. In a friction shock absorbing mechanism, the combination with a combined friction shell and spring cage, the shell having a pair of intermediate partitions therein dividing the shell into three friction chambers; of a set of friction devices in the central friction chamber, said set comprising elements having cooperable relatively blunt angle wedge faces; a set of friction devices in each of the outer friction chambers, each set comprising elements having cooperable relatively keen angle wedge faces, the outer ends of said keen angle sets of devices being normally extended slightly farther than the outer end of the central set of friction devices.

13. In a friction shock absorbing mechanism, the combination with a combined friction shell and spring cage, the shell having a pair of intermediate partitions therein dividing the shell into three friction chambers; of a set of friction devices in the central friction chamber, said set comprising elements having cooperable relatively blunt angle wedge faces; a set of friction devices in each of the outer friction chambers, each set comprising elements having cooperable relatively keen angle wedge faces; a spring resistance within the cage; a follower interposed between said spring and the inner ends of all three sets of friction devices; and means for retaining all of said sets of devices assembled with the shell.

In witness that I claim the foregoing I have hereunto subscribed my name this 25th day of November, 1921.

JOHN F. O'CONNOR.

Witnesses:
 UNA C. GRIGSBY,
 ANN BAKER.